US008858235B2

(12) United States Patent
Bain

(10) Patent No.: US 8,858,235 B2
(45) Date of Patent: Oct. 14, 2014

(54) DEVICE FOR FIXING A TURKEY TAIL FAN

(76) Inventor: Matthew R. Bain, Colby, KS (US)

( * ) Notice: Subject to any disclaimer, the term of this patent is extended or adjusted under 35 U.S.C. 154(b) by 180 days.

(21) Appl. No.: 13/589,851

(22) Filed: Aug. 20, 2012

(65) Prior Publication Data

US 2013/0045470 A1 Feb. 21, 2013

Related U.S. Application Data

(60) Provisional application No. 61/525,746, filed on Aug. 20, 2011.

(51) Int. Cl.
*G09B 23/00* (2006.01)
*B44C 5/02* (2006.01)

(52) U.S. Cl.
CPC .......................................... *B44C 5/02* (2013.01)
USPC .......................................................... 434/296

(58) Field of Classification Search
USPC ......... 434/295, 296, 297; 43/2; 428/16, 542.4
See application file for complete search history.

(56) References Cited

U.S. PATENT DOCUMENTS 5,064,725 A 11/1991 Acker
5,437,935 A 8/1995 Fredeen
6,487,810 B1 * 12/2002 Loughman .......................... 43/2
6,560,894 B2 5/2003 Leber
8,168,305 B1 * 5/2012 Peterson .................... 428/542.4
8,323,756 B2 * 12/2012 Peterson .......................... 428/16
2003/0082316 A1 * 5/2003 Scott ............................... 428/16
2006/0288621 A1 * 12/2006 Wicklander ..................... 40/700
2011/0232153 A1 * 9/2011 Jennings et al. ..................... 43/2
2012/0042561 A1 2/2012 Bain
2012/0261361 A1 * 10/2012 Deland ........................ 211/13.1

* cited by examiner

*Primary Examiner* — Kurt Fernstrom
(74) *Attorney, Agent, or Firm* — Hovey Williams LLP

(57) ABSTRACT

Apparatuses and methods for fixing a turkey tail fan are provided. The apparatuses can include a top and bottom sheet, an angled member, and a plurality of fasteners for fixing a turkey tail fan in a natural spread configuration. A kit for fixing and displaying a turkey tail fan is further provided.

25 Claims, 12 Drawing Sheets

DEVICE FOR FIXING A TURKEY TAIL FAN

CROSS-REFERENCE TO RELATED APPLICATION

This application claims the benefit of U.S. Provisional Patent Application No. 61/525,746, filed Aug. 20, 2011, which is incorporated by reference herein in its entirety.

BACKGROUND

1. Field of the Invention

This invention relates generally to fixing turkey tail fans. More particularly, this invention relates to apparatuses and methods for fixing a turkey tail fan.

2. Description of the Related Art

Although many hunters, taxidermists, and other admirers of wildlife commonly fix and display turkey fans, a simple device to easily fix a tail fan into an ideal position is lacking. U.S. Pat. No. 6,560,894 (Leber) discloses a device made to assist in such positioning and fixing, but the device requires a multitude of components, requires skill in individual tail feather positioning, and is difficult to reproduce. This previous disclosure relies upon a multitude of dowels and a matrix of holes, such that each individual tail feather can be positioned by inserting a dowel into a hole that corresponds to that tail feather's desired location. Specifically, a small stabilizing block is drawn toward a back plate to press and secure only the very basal portion of the tail. Leber's system is a reusable version of a technique of fixing a turkey tail fan by using nails or staples to pin tail feathers into position upon a flat surface, such as a board or cardboard.

Despite Leber's disclosure, most individuals continue to tack their tail fan to a board or other surface using nails, staples, or other fasteners and allow the tail to dry. Not all individuals that desire to fix a tail fan have such materials readily available or because of a lack of experience, are not able to properly position and secure the fan, resulting in a less than desirable outcome.

Various taxidermists may form a bonding adhesive around the base of the tail, which cures and forms a mold prior to the drying of the tail fan. The prior art lacks a device or process to assist in this procedure.

Other disclosures such as U.S. Pat. No. 5,064,725 (Acker) serve as a mounting kit to display a turkey tail fan and other parts that have already been positioned and fixed. Acker neither discloses a means of temporarily fastening and displaying a turkey tail, nor discloses the utilization of a picture and/or picture frame in displaying a turkey tail fan. Specifically, Acker does not disclose the use of a picture and/or picture frame to fasten or conceal the basal portion of the tail.

U.S. Pat. No. 5,437,935 (Fredeen) discloses the use of a picture frame and associated insertion structure in the display of individual tail feathers comprising a turkey tail fan. However, individual feathers must be detached from the original turkey tail fan and placed into the display assembly. In addition to this disclosure being an irreversible process in terms of further use of the tail fan outside of this display assembly, it requires prohibitive complexity in the device, skill in feather positioning, and difficulty in achieving a realistic result.

The prior art lacks the use of a hole placed in the basal portion of a turkey tail fan, to fasten the tail fan to a concealment structure such as a picture frame, plaque, block, or sheet. Prior art also lacks a device or process that allows temporary fastening and display, as well as means of concealing fasteners with a turkey beard and associated insertion structure.

SUMMARY OF THE INVENTION

In one embodiment of the present invention, there is provided an apparatus for fixing a turkey tail fan in a natural spread configuration, where the turkey tail fan includes a basal portion including connective and/or muscle tissue holding together individual feathers of the fan. The apparatus includes a bottom sheet presenting a substantially flat first surface, a top sheet presenting a substantially flat second surface, an angled member extending from the bottom sheet and presenting a support surface that is substantially perpendicular to the first surface, and a plurality of fasteners for releasably coupling the top and bottom sheets to one another. The apparatus is shiftable between a fan-positioning configuration and a fan-holding configuration.

In another embodiment of the present invention, there is provided a method of fixing a turkey tail fan. The method includes (a) positioning a turkey tail fan on a bottom member in a natural spread configuration, (b) placing a top member over the turkey tail fan while the turkey tail fan is in the natural spread configuration on the bottom member, and (c) fastening the top and bottom members to one another in a fan-holding configuration via a plurality of fasteners extending through the turkey tail fan, thereby fixing the turkey tail fan between the top and bottom members in the natural spread configuration.

In yet another embodiment of the present invention, there is provided a kit for fixing and displaying a turkey tail fan in a natural spread configuration, where the turkey tail fan includes a basal portion including connective and/or muscle tissue holding together individual feathers of the fan. The kit includes a fan-fixing apparatus for fixing the turkey tail fan in the natural spread configuration. The fan-fixing apparatus is shiftable between a fan-positioning configuration and a fan-holding configuration, where the fan-fixing apparatus is configured to receive the turkey tail fan when in the fan-positioning configuration, where the fan-fixing apparatus is configured to hold the turkey tail fan in the natural spread configuration when in the fan-holding configuration. The fan-fixing apparatus includes at least one guide hole for guiding the drilling of an attachment hole through the basal portion of the turkey tail fan while the fan is held in the fan-fixing apparatus. The kit further includes a fan-displaying apparatus for displaying the turkey tail fan in the natural spread configuration. The fan-displaying apparatus includes a concealment structure and at least one fastener, where the fastener is configured to extend at least partly into the attachment hole and fasten the concealment structure to the basal portion of the turkey tail fan. The concealment structure is configured to cover the basal portion of the turkey tail fan.

In still another embodiment according to the present invention, there is provided a device for spreading and drying a turkey tail fan, so that the fan can remain in a fixed position for display or other use. The device includes flat opposing surfaces placed on either side of a turkey tail fan, resting upon a perpendicular surface. The two sheets are attached to one another and to the perpendicular surface by multiple fasteners or other mechanisms which function as clamps, such that the distance between the two sheets can be reduced, flattening the turkey tail fan into an appropriate position for drying. The sheets include corresponding holes that allow the positioning of a hole to be drilled in a dried fan. This hole can then be used to temporarily or permanently attach the tail fan to a turkey decoy device or to a structure for displaying a fixed tail fan.

Various embodiments of the present invention provide a simple, self-contained, reusable device which can be used by anyone to position and fix a turkey tail fan. It is simple in that it relies upon very few fasteners and corresponding holes in two flat surfaces. Because various embodiments of the present invention include flat surfaces that cover an area much larger than only the basal portion of the tail, are of equal size, and are drawn together at multiple, diffuse points, these embodiments equally encompass, press, flatten, and fix all portions of the tail fan that lie between the two surfaces. The resulting fixed fan is uniformly flattened in a single plane, requires much less positioning, and is more easily and efficiently achieved.

In yet another embodiment of the present invention, there is provided a means to permanently or temporarily fasten the fixed turkey tail fan to a concealment structure (fan-displaying apparatus), such as, for example, a wall hanger with picture frame or plaque, using the same means as fastening the fixed turkey tail fan to a decoy or decoy device.

BRIEF DESCRIPTION OF THE FIGURES

Embodiments of the present invention are described herein with reference to the following drawing figures, wherein.

DETAILED DESCRIPTION

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
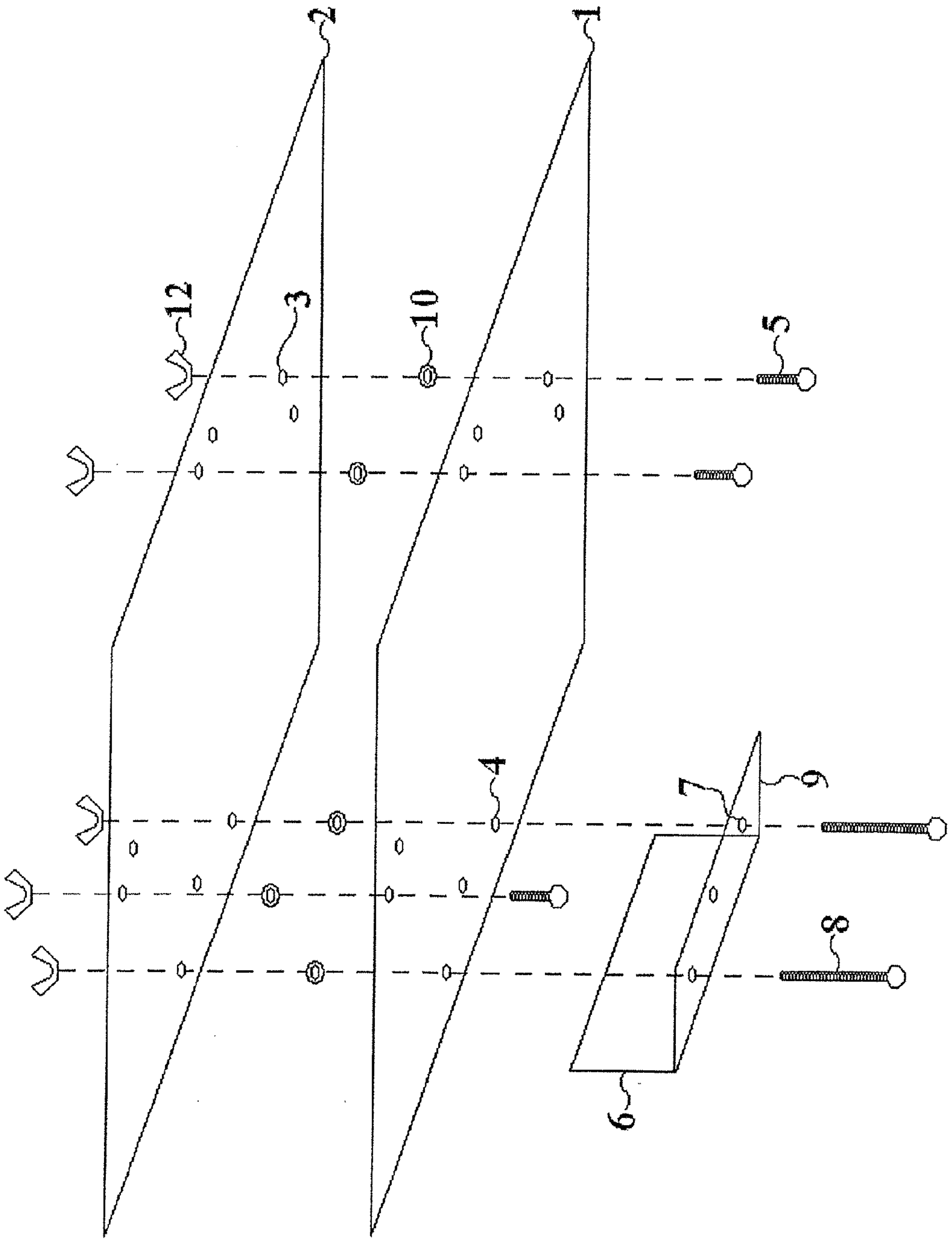
FIG. 1 is an exploded view of an apparatus in accordance with one embodiment of the present invention, particularly showing top and bottom sheets, an angled member with a surface perpendicular to the sheets, and fasteners.

FIG. 1 depicts one embodiment of an apparatus in accordance with the present invention. The device includes opposing surfaces 1 and 2. In certain embodiments, the opposing surfaces 1 and 2 can include sheets fabricated from plastic, rubber, composites, wood, fiber, or metals. Rigid yet slightly flexible sheets are advantageous over other components used to press turkey tail fans, because they maintain their overall flatness, but are flexible enough to conform to all portions of the underlying fan. Furthermore, because the sheets press the entirety of the turkey tail fan lying between them, the resulting fixed fan is evenly flattened, and easily achieved with minimal fastening and positioning. In one or more embodiments, each sheet can include multiple corresponding holes 3 and 4, where fasteners 5 or other mechanisms, which function as clamps, such as spring-loaded clamps, can be inserted or attached to draw the two sheets together. In another embodiment, very few fasteners located at regular diffuse locations on the two flat surfaces contribute to the simplicity and effectiveness of the device. In certain embodiments, when assembled, two sheets 1 and 2 rest upon a perpendicular support surface of an angled member 6, which can be temporarily attached to both sheets by utilizing holes 7 and reusable fasteners 8 in a third surface 9. In certain other embodiments, the third surface is fixedly attached to the perpendicular support surface of the angled member 6 at a substantially 90 degree angle, and parallel to the sheets 1 and 2. In one or more embodiments, the perpendicular support surface and the third surface 9 of the angled member 6 can be formed by bending a metal sheet to form an edge across. Alternatively, in another embodiment, the angled member 6 can be integral with the bottom sheet 1 and with the perpendicular support surface extending from the bottom sheet 1 substantially perpendicular to the bottom sheet 1. The perpendicular support surface of the angled member 6 provides support for the basal portion of the turkey tail, allowing the basal portion to be stationary so that the feathers of the turkey tail fan can be spread.

In the embodiment depicted in FIG. 1, the fasteners 8 are placed through holes 7 in the angled member, then through corresponding holes 4 in the bottom sheet 1. As shown in FIG. 1, fasteners 5 are also placed through other holes 3 in the bottom sheet 1 and retaining rings or washers 10 can then be placed around the portion of the fasteners 5 protruding through the bottom sheet 1. Preferably, retaining rings 10 loosely secure the fasteners 5 to the bottom sheet 1, so that the fasteners remain in place during further assembly.

In certain embodiments, the apparatus can be in a fan-positioning configuration. As explained below with reference to FIG. 2, a fan fixing apparatus in a fan-positioning configuration includes a top sheet and a bottom sheet that are sufficiently spaced apart to allow a turkey tail fan to be positioned on a bottom sheet and against a surface of an angled member.

Figure 2:
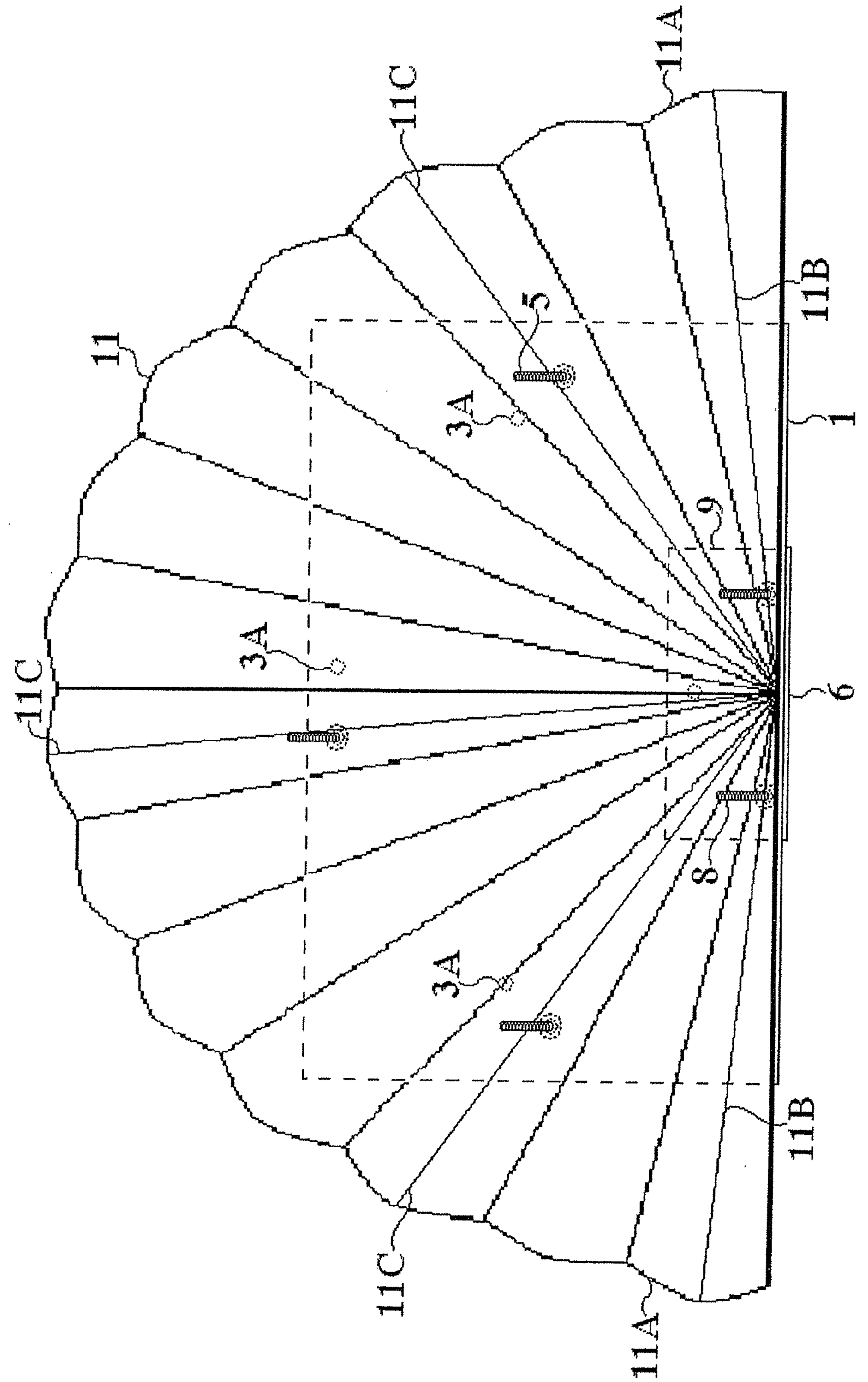
FIG. 2 is a top view of an apparatus in a fan-positioning configuration in accordance with one embodiment of the present invention, particularly showing a turkey tail fan positioned over the bottom surface and resting thereon, and held into position by protruding fasteners.

Referring to the embodiment depicted in FIG. 2, the angled member 6 and bottom sheet 1 are placed horizontally upon a flat surface with the support surface of the angled member 6 and fasteners 5 and 8 protruding upward in a substantially perpendicular direction relative to the bottom sheet 1. As shown in FIG. 2, the basal portion of the turkey tail fan 11 is placed against the perpendicular support surface of the angled member 6 and the outward/bottom two feathers 11A of the turkey tail fan 11 are spread and their shafts 11B are placed between fan-position protrusions, such as fasteners 8 running through the third surface 9 and the bottom sheet 1. By positioning these two feather shafts 11B into this device, all other individual tail feathers of the tail fan are simultaneously positioned and spread in a natural spread configuration. As illustrated in FIG. 2, if the feather shafts 11C interfere with the fasteners 5 distal from the base of the tail fan, or in the rare instance that individual feather shafts are not evenly spread, the fasteners 5 can be placed in alternate holes 3A so that the fasteners 5 do not interfere with the desired location of the feather shafts 11C. In certain embodiments, once the turkey tail fan 11 has been placed upon the bottom sheet 1 and against the perpendicular support surface of angled member 6, and fasteners 5, 8 are protruding through the tail fan, the top sheet 2 can be placed thereon and secured.

In certain embodiments, the fan-fixing apparatus can be shifted from a fan-positioning configuration (for receiving the fan) into a fan-holding configuration (for holding the fan in the natural spread configuration). As explained below with reference to FIG. 3, when the fan-fixing apparatus is in a fan-holding configuration, the top and bottom sheets are secured together by fasteners, fixing the turkey tail fan between the sheets while the basal portion of the fan is held against the support surface of the angled member 6. In certain embodiments, at least 3, 4, 5, or 6 fasteners and/or less than 16, 12, 10, or 8 fasteners are used to hold the apparatus in the fan-holding configuration. In certain embodiments, when in the fan-holding configuration, the top sheet covers at least 25%, 40%, or 60% and/or not more than 100%, 90%, or 80% of the front of the turkey tail fan.

Figure 3:
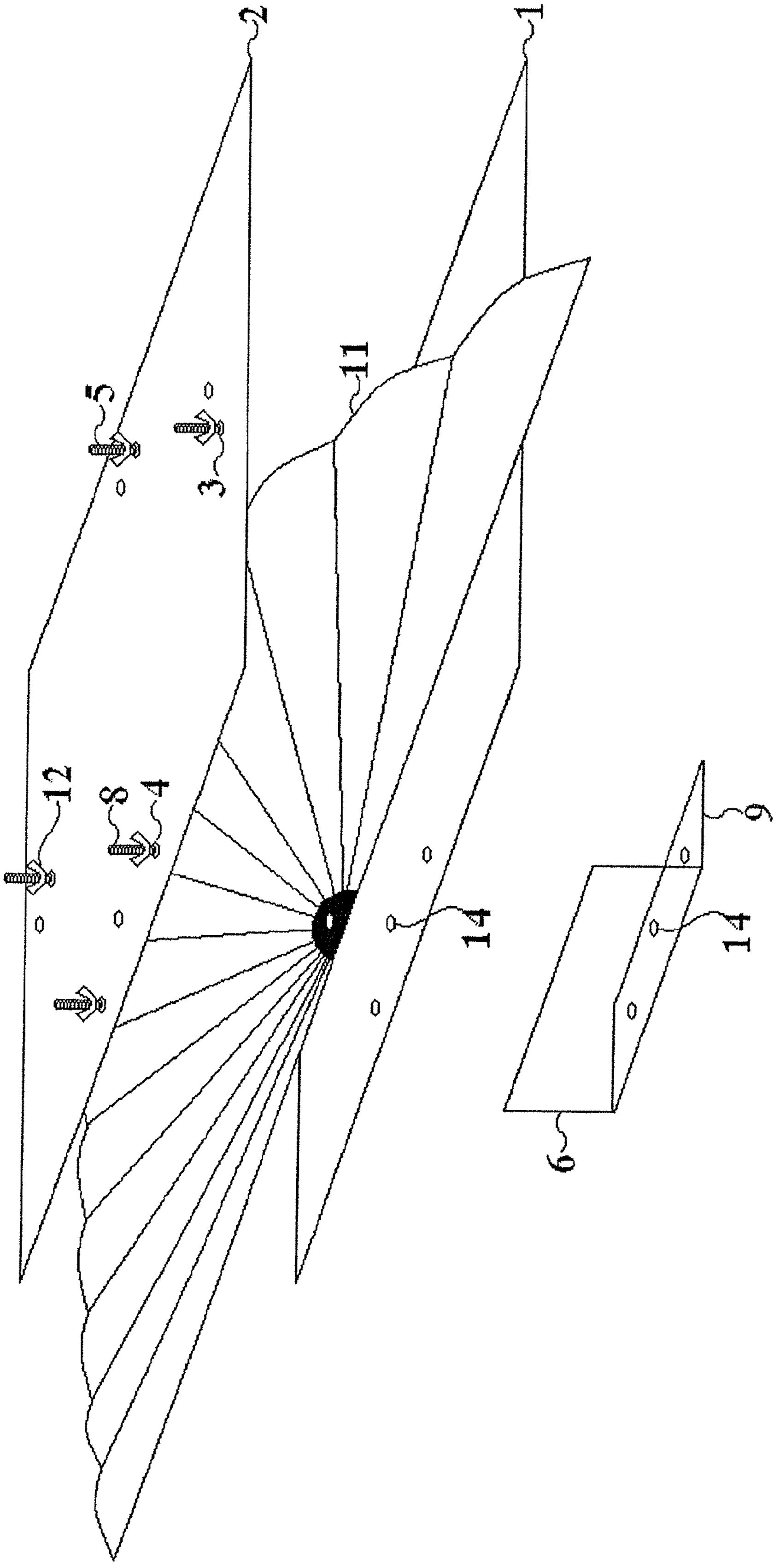
FIG. 3 is an exploded view of an apparatus in a fan-holding configuration in accordance with one embodiment of the present invention, particularly showing the positioning of the turkey tail fan relative to (i) the top and bottom sheets, (ii) the perpendicular surface, and (iii) the fasteners.

In the embodiment depicted in FIG. 3, the top sheet 2 is placed over the turkey tail fan 11 and attached to the bottom sheet 1 and the angled member 6 by inserting the fasteners 5, 8 through corresponding holes 3, 4. Complementary fastening components 12 can now be fastened loosely to the protruding fasteners 5, 8. Although it is not generally required, at this time the user can manipulate locations of individual feathers to ensure proper spacing. Once the proper spread is achieved, the user tightens the fasteners 5, 8 to secure tail feathers and the base of the tail feathers into position. If necessary, the user can further manipulate individual feathers to ensure proper positioning after the fasteners are completely tightened. Tightening the fasteners also flattens the feathers into a single plane, rendering the fan suitable for display or other use.

Additionally, as shown in FIG. 3, corresponding guide holes 14 located through both sheets 1, 2 and through the third surface 9 function as a guide for the positioning and drilling of an attachment hole through the basal portion of a dried fan, in order to fit the fan to a turkey decoy device or tail fan display support. In one embodiment, the hole 14 can also provide a location to insert a nail or other protrusion to hang the fan while it is being dried or cured. In another embodiment, the holes 14 can accept a fastener 8 to provide additional securing locations for the tail fan 11.

Figure 4:
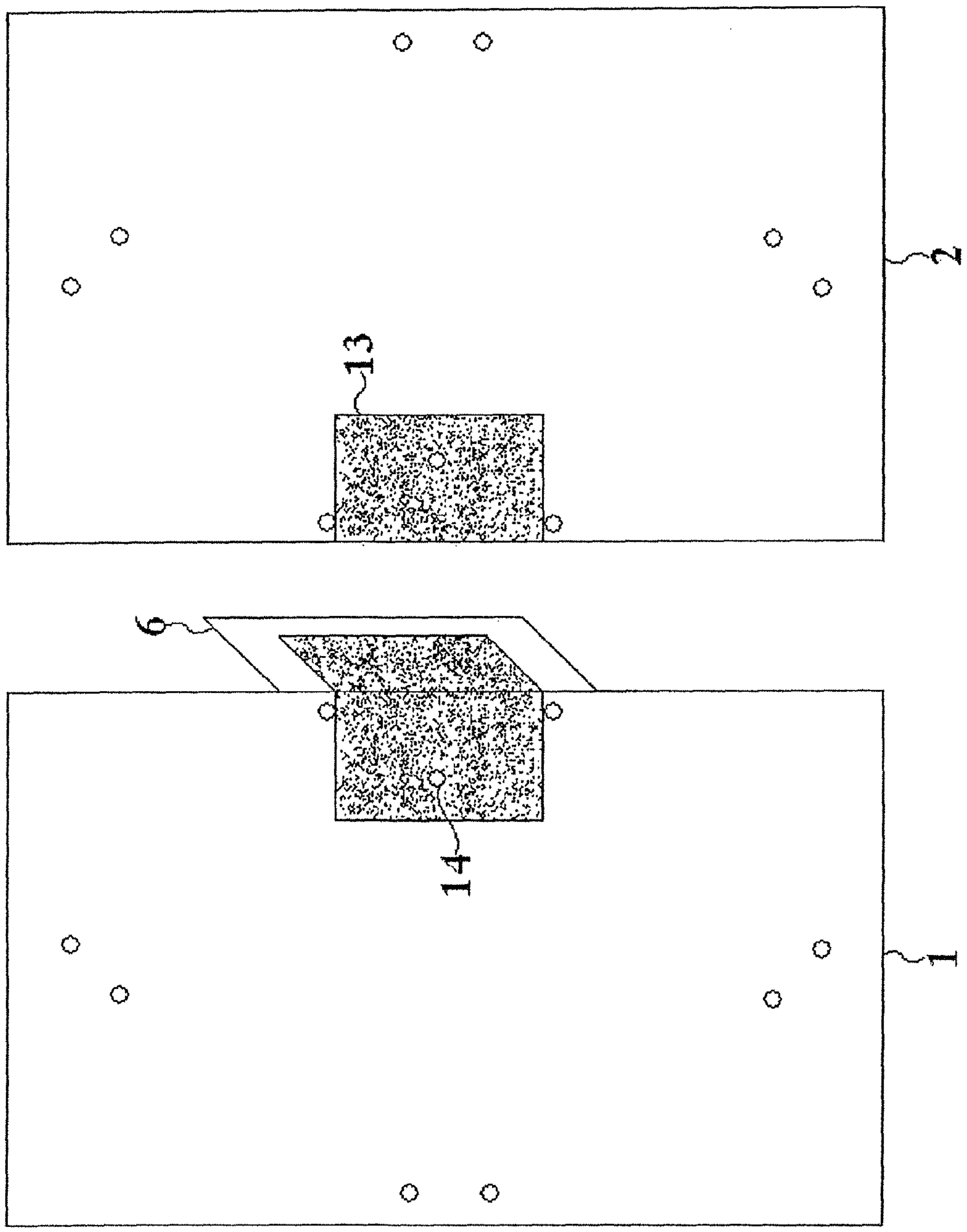
FIG. 4 is a top view of an apparatus in a fan-positioning configuration in accordance with one embodiment of the present invention, particularly showing the positioning of a breathable material on the top and bottom sheets and the angled member.

In certain embodiments, a form bonding adhesive may be applied around the base of the tail fan 11, which quickly cures and holds the fan 11 in position while the connective and muscle tissue dries. One advantage of using bonding adhesive is that the tail fan 11 is rapidly fixed into position and is readily available for use in decoying or display. In the embodiment depicted in FIG. 4, the sheets 1, 2 and perpendicular support surface of the angled member 6 can be lined with a breathable material 13, such as, for example, adhesive-backed wool felt, so that the flesh and connective tissue at the base of the tail fan 11 are not directly contacting the sheets when the fan 11 is secured between them, thereby expediting curing and drying as well as preventing spoiling. In one or more embodiments, to aid in proper positioning during the curing process, the sheets 1, 2 and breathable material 13, can be lined with a liner such as cellophane plastic wrap or waxed paper, the bonding adhesive can be applied to either or both sides of the fan 11, and then secured in the device for positioning and drying. As shown in FIG. 4, corresponding guide holes 14, which function as drilling guides, are located through both sheets 1, 2 and the breathable material 13; upon curing, the hole in the bonding adhesive can be drilled through at the same time and in the same location as the attachment hole in the basal portion of the tail fan 11.

In one embodiment, once a turkey tail fan has been fixed and held by the fan fixing apparatus in a fan-holding configuration for a time sufficient to allow the basal portion of the fan to dry, the top and bottom sheets can be detached so that the fixed turkey tail, now able to sustain itself in a natural spread configuration without requiring external support, can be removed from the fan fixing apparatus and used in a display or decoy device.

Figure 5A:
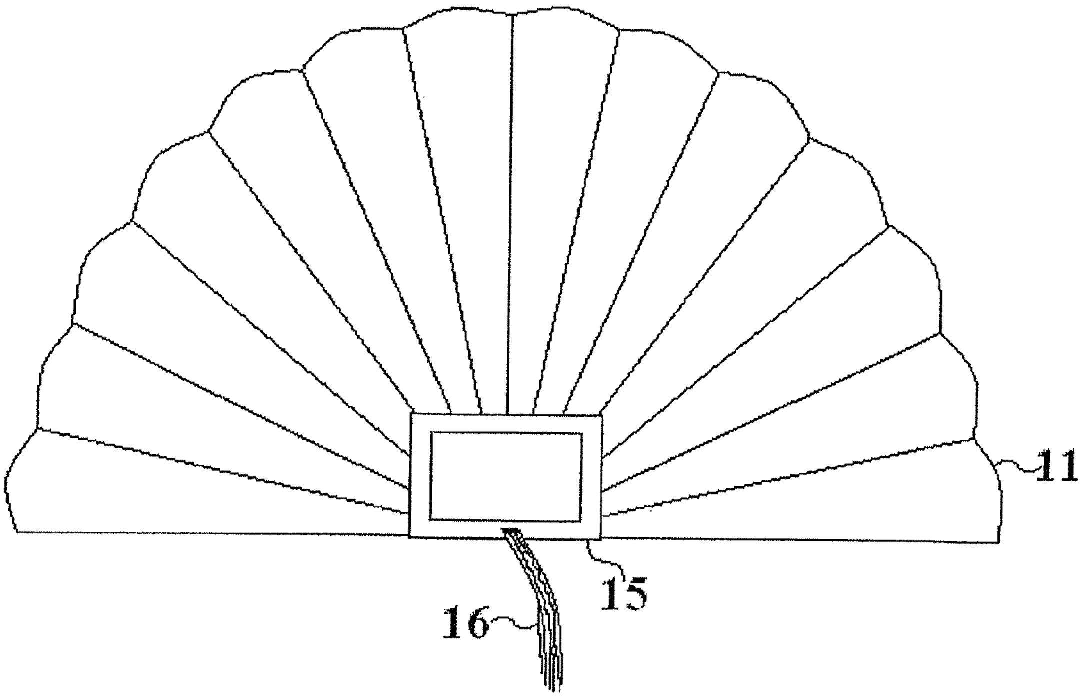
FIG. 5A is a front elevational view of an apparatus in accordance with one embodiment of the present invention, particularly showing a turkey tail fan in a natural spread configuration with a picture frame over the tail's basal portion, and further showing the position of a turkey beard.

As depicted in the embodiment of FIG. 5A, a fixed turkey tail fan 11 is attached to a picture frame 15, and a turkey beard 16 for concealment of fastening members 18. As shown in the embodiment of FIG. 5A, not only does the picture frame 15 allow a photograph, associated with the harvest of the trophy to be included in the display of the turkey tail, for example, but the picture frame 15 also conceals the basal portion of the turkey tail fan 11.

Figure 5B:
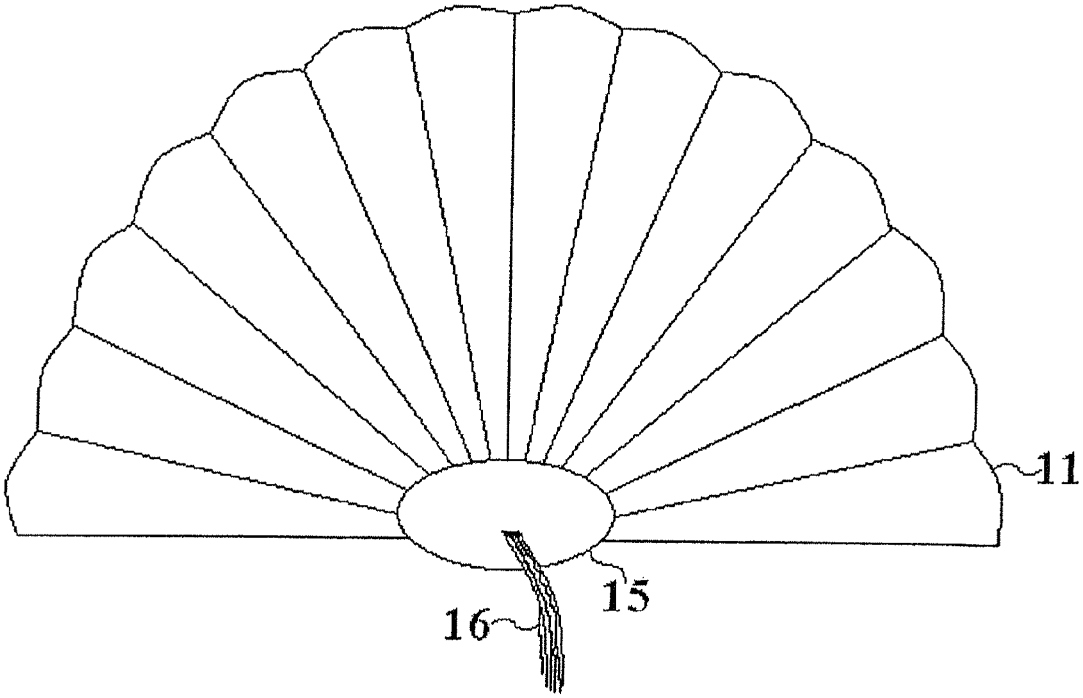
FIG. 5B is a front elevational view of an apparatus in accordance with one embodiment of the present invention, particularly showing a turkey tail fan in a natural spread configuration with a plaque over the tail's basal portion, and further showing a turkey beard.

In another embodiment depicted in FIG. 5B, a fixed turkey tail fan 11 can also be attached to any type of slightly rigid or rigid concealment structure 15, constructed of any material, and configured in any shape. For example, in certain embodiments, the concealment structure 15 is sized to cover substantially all of the basal portion of a turkey tail fan 11 while permitting the viewing of substantially all of the plumage of the feathers.

Figure 6A:
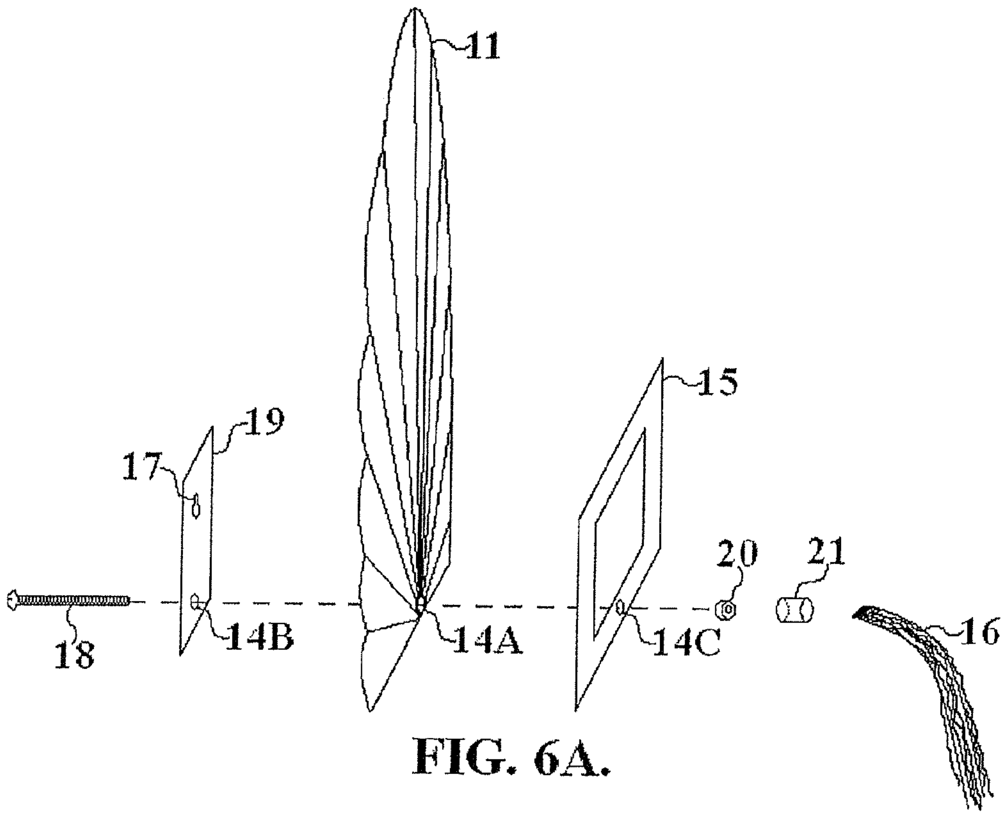
FIG. 6A is an exploded view of the apparatus of FIG. 5A, particularly showing the position of the frame, hanging structure, fastener, and guide hole relative to the turkey tail fan in a natural spread configuration.

FIG. 6A depicts an exploded view of the wall hanging picture frame assembly in FIG. 5A. As shown in FIG. 6A, the assembly utilizes the attachment hole 14A formed when utilizing the above-described tail fan fixing device to attach hanging structure 19 to the fixed tail fan 11 and the picture frame 15 by inserting fastener 18 through holes 14A, 14B, and 14C. The hanging structure 19 allows for displaying the turkey tail fan 11 on a wall, which is a typical display position. In one embodiment, the fastener 18 protrudes through the hole 14C in the picture frame 15 to allow a complementary fastener 20, such as a nut, to be tightened thereby, securing the frame 15 against the fan 11 and hanging structure 19. As shown in FIG. 6, a snug fitting sleeve or collar 21 is placed around the complementary fastener 20 to conceal the fasteners 18 and 20. In the embodiment depicted in FIG. 6A, the collar 21 has an outward open end that provides a location for insertion of a turkey beard 16, which further conceals the fastening members 18 and 20 and completes the display of the trophy. One major advantage of this assembly is that its components can be easily assembled, disassembled, and reassembled. For example, a turkey tail fan can be displayed with a photograph of a successful harvest, removed, and utilized with a decoy or decoy device to harvest another turkey, then replaced onto the picture frame display assembly.

Figure 6B:
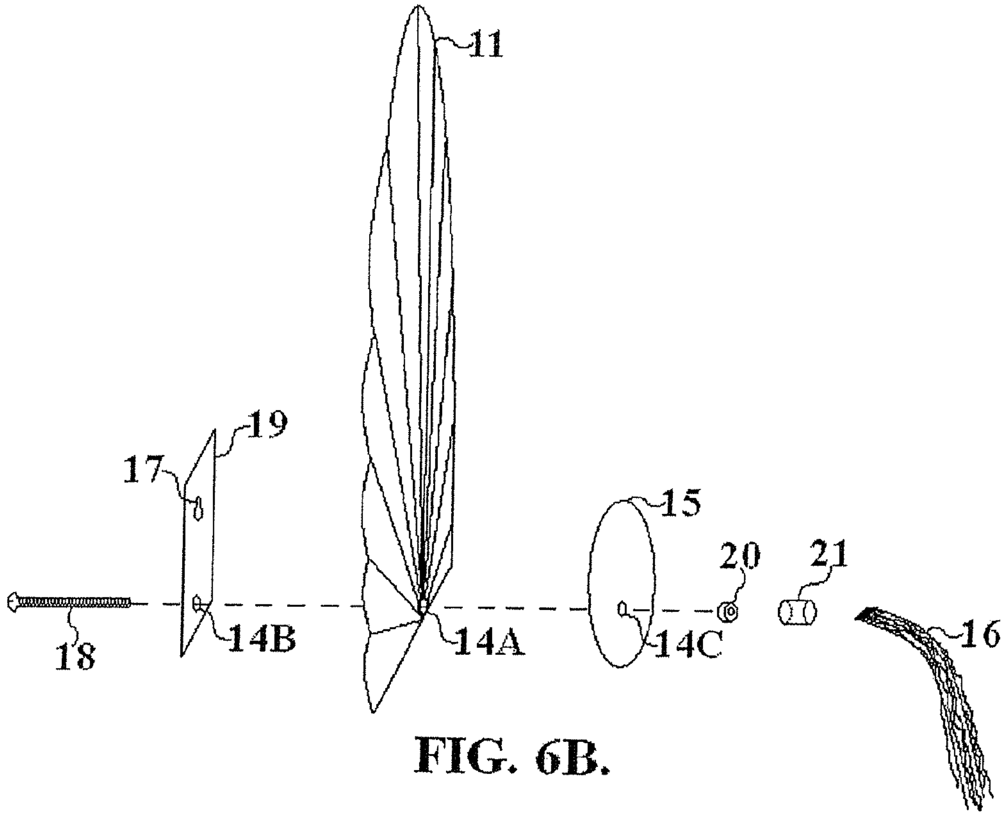
FIG. 6B is an exploded view of the apparatus of FIG. 5B, particularly showing the position of the plaque, hanging structure, fastener, and guide hole relative to the turkey tail fan in a natural spread configuration.

FIG. 6B depicts an exploded view of the wall hanging plaque assembly of FIG. 5B. As shown in FIG. 6B, the assembly utilizes the attachment hole 14A formed when utilizing the above-described tail fan fixing device to attach hanging structure 19 to the fixed tail fan 11 and the plaque 15 by inserting fastener 18 through holes 14A, 14B, 14C. One advantage of this assembly is that a photograph is not necessary to complete the display, and its components can also be easily assembled, disassembled, and reassembled.

Figure 7:
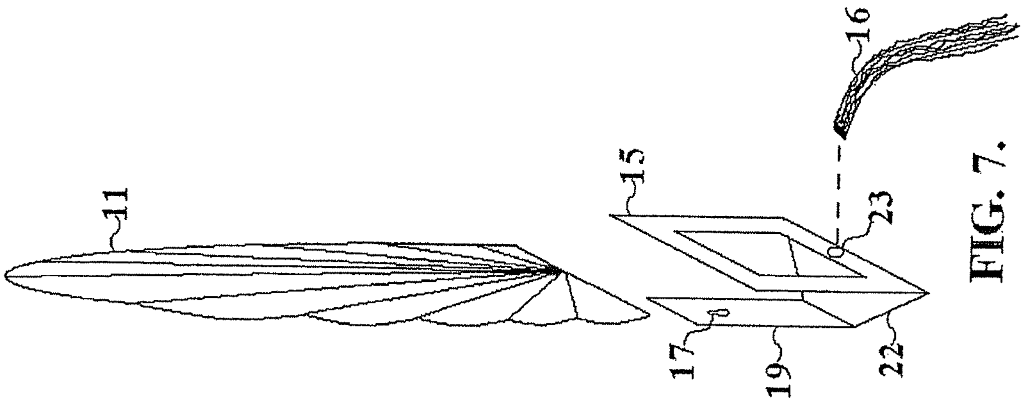
FIG. 7 is a an exploded view of an apparatus in accordance with one embodiment of the present invention, particularly showing a picture frame integrally joined with a hanging structure and providing a resting space between the frame and the hanging structure for a turkey tail fan in a natural spread configuration.

FIG. 7 illustrates an embodiment of a wall hanging turkey tail fan support and display structure wherein the picture frame 15 and the hanging structure 19 are formed as an integral, one-piece, unitary member. Thus, the embodiment of FIG. 7 does not require an attachment hole in the turkey tail fan 11 when the fixed turkey tail fan 11 is placed between the picture frame 15 and the hanging structure 19. As shown in FIG. 7, the tail fan 11 rests upon the flat, horizontal surface 22, which connects the hanging structure 19 to the picture frame 15. In certain embodiments, a hole 23 can be located in the picture frame 15 to allow insertion and display of a turkey beard 16. In one or more embodiments, the picture frame 15 can include various structures for attaching the turkey beard 16, such as a tube, with one end attached to the picture frame 15, and the other end open, allowing insertion of the turkey beard 16. As shown in FIG. 7, the distance between the picture frame 15 and hanging structure 19 is such that the turkey tail fan 11 rests snugly between the two surfaces so that the tail fan 11 is secure, but can be easily removed. In certain embodiments, it may be necessary to include foam, fiber, paper, or other filler between the structures 15, 19 and the tail fan 11 to further secure the tail fan 11.

Figure 8:
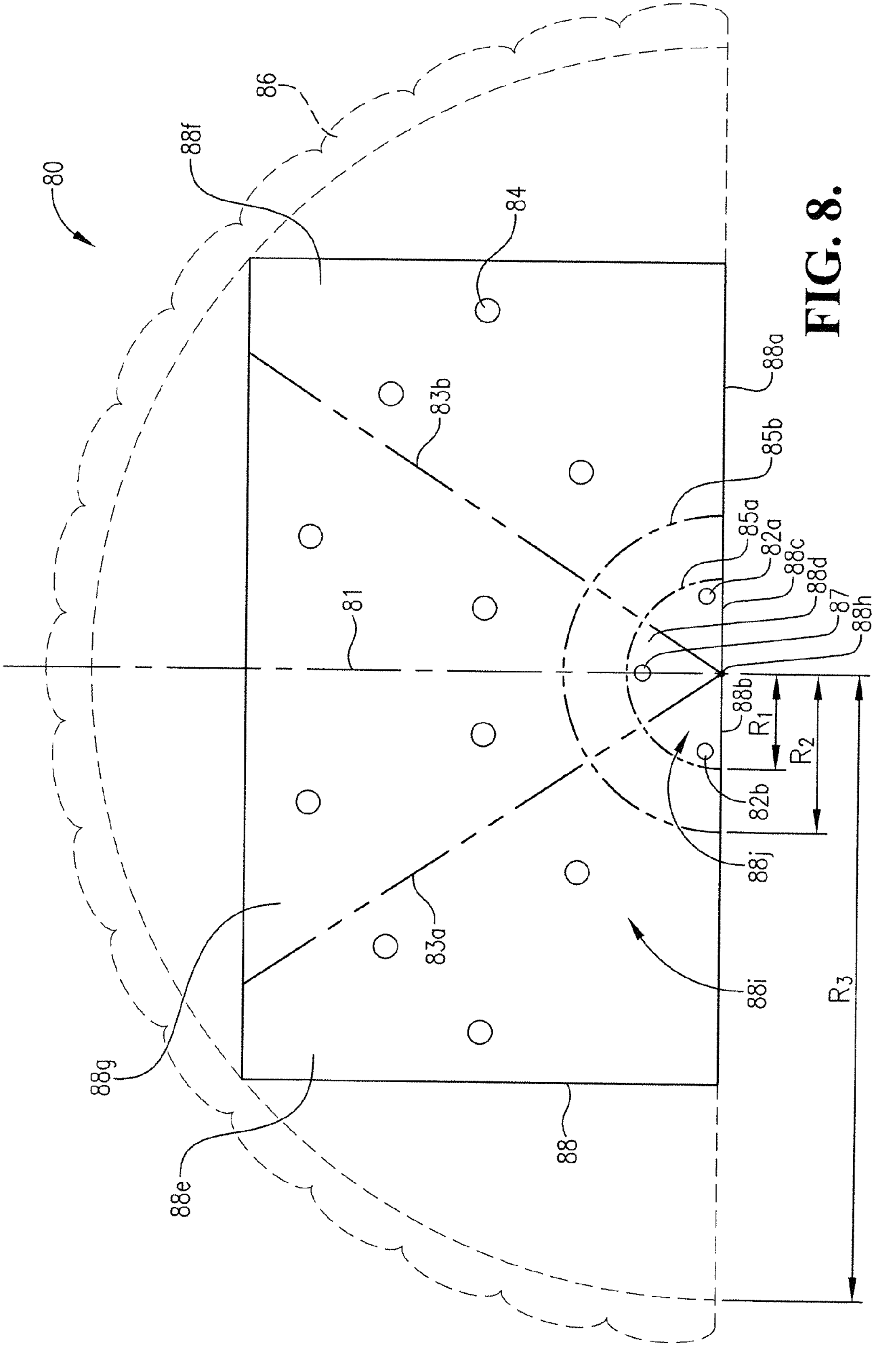
FIG. 8 is a top view of a bottom sheet in a fan-positioning configuration in accordance with one embodiment of the present invention, particularly showing a sheet having a rectangular shape, basal and distal regions and sub-regions, and a plurality of potential fastener positions.

FIG. 8 depicts one embodiment of a bottom sheet 88 of a turkey tail fan fixing device in a fan-positioning configuration, ready to receive a fan. In one or more embodiments of a fan fixing apparatus, the top sheet can be substantially similar or identical to the bottom sheet 88. In other embodiments of a fan fixing apparatus, the top sheet and bottom sheets may be differently configured.

Figure 9:
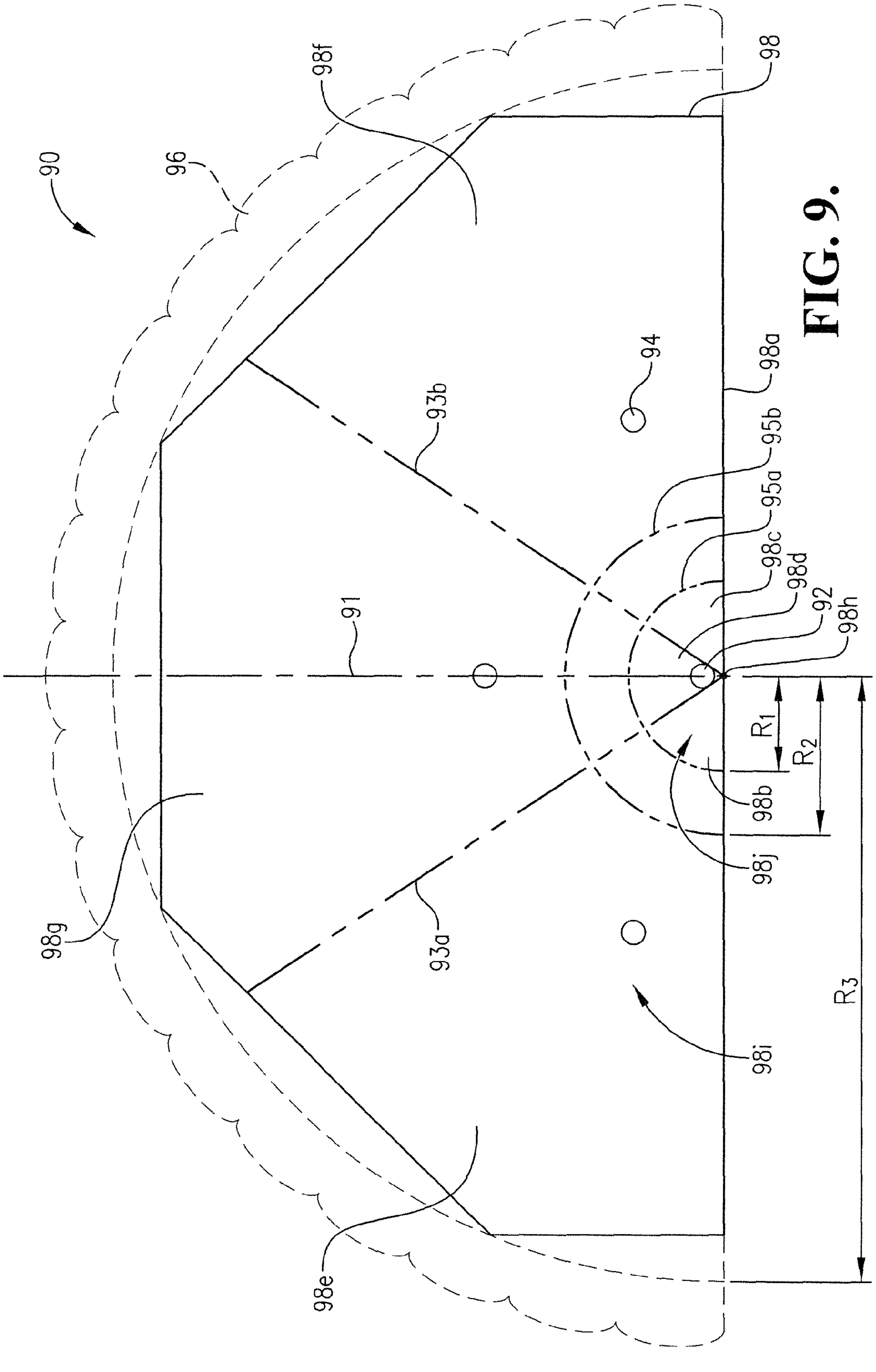
FIG. 9 is a top view of a sheet in a fan-positioning configuration in accordance with another embodiment of the present invention, particularly showing a sheet having a six-sided polygon shape, basal and distal regions and sub-regions, and a plurality of potential fastener positions.
Figure 10:
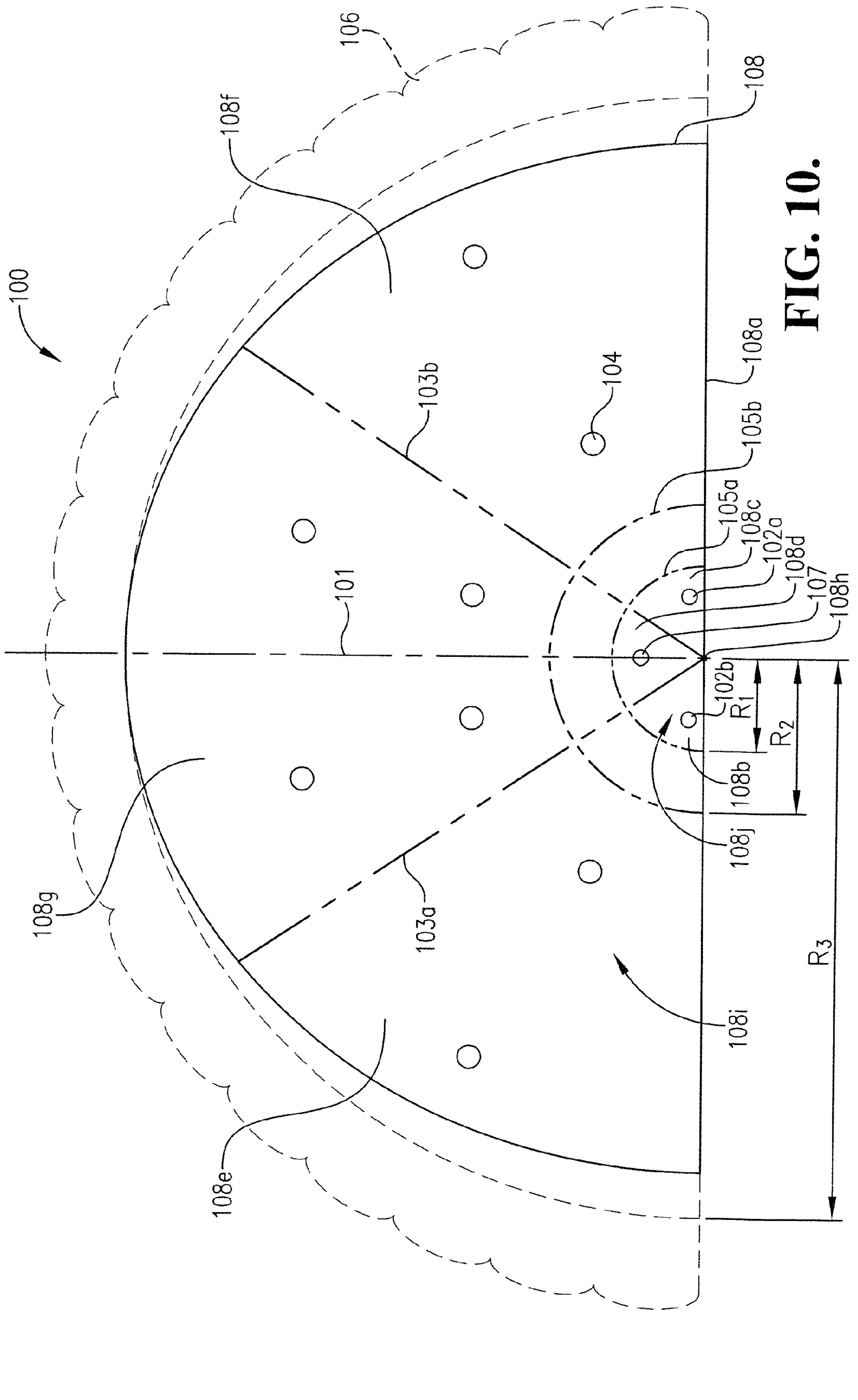
FIG. 10 is a top view of a sheet in a fan-positioning configuration in accordance with yet another embodiment of the present invention, particularly showing a sheet having a semicircular shape, basal and distal regions and sub-regions, and a plurality of potential fastener positions.
Figure 11:
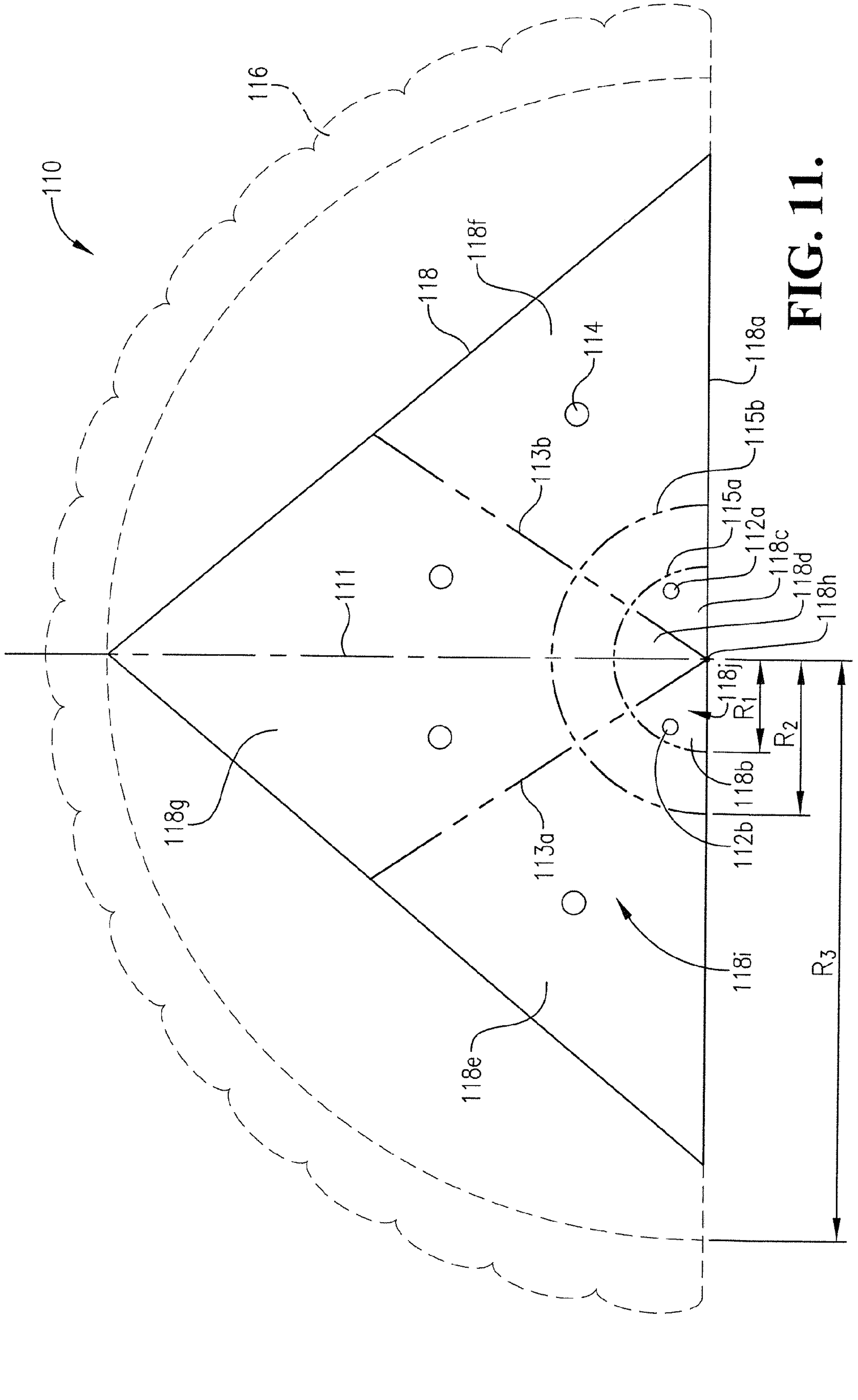
FIG. 11 is a top view of a sheet in a fan-positioning configuration in accordance with another embodiment of the present invention, particularly showing a sheet having a triangular shape, basal and distal regions and sub-regions, and a plurality of potential fastener positions.

The bottom sheet 88 depicted in FIG. 8 has a substantially rectangular shape. However, as shown in FIGS. 9-11, the bottom sheet of the fan fixing device can have any number of shapes that are suitable to provide support and cover at least a portion of a turkey tail fan.

The bottom sheets 88 depicted in FIGS. 8-11 can present a substantially flat surface size to engage a substantial portion of the turkey tail fan. In certain embodiments, the substantially flat surface presented by the bottom sheet 88, as well as the opposing substantially flat surfaces of the top sheet, can have a surface area that is at least 25 square inches, 50 square inches, 75 square inches, or 100 square inches and/or not more than 1,600 square inches, 1,200 square inches, 600 square inches, or 300 square inches. As shown in FIG. 8, the size of the bottom sheet 88 can also be expressed in terms of the maximal radial distance $R_3$ between the edge of the bottom sheet 88 and a bottom edge center point 88*h* of the bottom sheet 88. The bottom edge center point 88*h* is the point at which a center axis 81 of the bottom sheet 88 intersects the bottom edge 88*a* of the sheet 88. In certain embodiments, $R_3$ can be at least 12 inches, 14 inches, or 18 inches and/or not more than 30 inches, 26 inches, or 24 inches.

Certain aspects of the fan fixing device can be best described with respect to various reference regions and sub-regions of the fan fixing device. These regions and sub-regions of the fan fixing device are cooperatively formed by both the top and bottom members of the device. However, for ease of illustration, these regions and sub-regions are described below with reference to the bottom sheet 88 in FIGS. 8-11.

FIG. 8 shows that the bottom sheet 88 can be divided into a basal region 88*j* and a distal region 88*i*. The basal region 88*j* is a region bounded by a bottom edge 88*a* of the bottom sheet 88 and a semicircular basal margin 85*a*. The semicircular basal margin 85*a* has a radius $R_1$ of 2 inches and is centered on a bottom edge center point 88*h* of the bottom sheet 88. Thus, as used herein, the term "basal region" shall denote a semicircular region of two inch radius that is centered on the bottom edge of the fan fixing device.

The basal region 88*j* can be divided into left, right, and center basal sub-regions 88*b*, 88*c*, 88*d* by left and right radially extending margins 83*a* and 83*b*. The left and right radially extending margins 83*a* and 83*b* are straight lines extending at 60 degree angles from bottom edge center point 88*h*, where the angles of extension are measured from the bottom edge 88*a* of the bottom sheet 88. The left basal sub-region 88*b* is bounded by the bottom sheet edge 88*a*, the semicircular basal margin 85*a*, and the left radially extending margin 83*a*. The right basal sub-region 88*c* is bounded by the bottom sheet edge 88*a*, the semicircular basal margin 85*a*, and the right radially extending margin 83*b*. The center basal sub-region 88*d* is bounded by the semicircular basal margin 85*a* and the left and right radially extending margins 83*a* and 83*b*. Thus, as used herein, the terms "left, right, and center basal sub-regions" shall denote respective congruent left, right, and center pie-shaped sub-regions that make up the basal region.

The distal region 88*i* is a region spaced radially outwardly from the basal region 88*j*. The distal region 88*i* is bounded by a semicircular distal margin 85*b* and the outer edges of the bottom sheet 88 that are positioned radially outwardly from the semicircular distal margin 85*b*. The semicircular distal margin 85*b* has a radius $R_2$ of four inches and is centered on the bottom edge center point 88*h* of the bottom sheet 88. Thus, as used herein, the term "distal region" shall denote the entire region of the fan fixing device located four or more inches from the center point of the bottom edge of the fan fixing device.

The distal region 88*i* can be divided into left, right, and center basal sub-regions 88*e*, 88*f*, 88*g* by the left and right radially extending margins 83*a* and 83*b*. The left distal sub-region 88*e* is bounded by the left radially extending margin 83*a*, the semicircular distal margin 85*b*, and the perimeter of the bottom sheet located to the left of the left radially extending margin 83*a* and the semicircular distal margin 85*b*. The right distal sub-region 88*f* is bounded by the right radially extending margin 83*b*, the semicircular distal margin 85*b*, and the perimeter of the bottom sheet 88 located to the right of the right radially extending margin 83*b* and the semicircular distal margin 85*b*. The center distal sub-region 88*g* is bounded by the semicircular distal margin 85*b*, the left and right radially extending margins 83*a* and 83*b*, and the perimeter of the bottom sheet 88 located between the left and right radially extending margins 83*a* and 83*b*. Thus, as used herein, the terms "left, right, and center distal sub-regions" shall denote left, right, and center sub-regions of the distal region that are divided from one another by left and right lines extending from the center point of the bottom edge at 60 degree angles, measured from the bottom edge of the fan fixing device to left and right of the center point of the bottom edge, respectively.

The bottom sheet 88 of FIG. 8 includes a guide hole 87 in the center basal sub-region 88*d*. As discussed above, the guide hole 87 is a hole that can be used to create an attachment hole in the basal portion of a turkey tail fan. In certain embodiments, when the fan fixing apparatus is in a fan-holding configuration, the guide hole 87, located in the center basal sub-region 88*d*, can be aligned with a corresponding guide hole in the center basal sub-region of a top sheet to permit the formation of an attachment hole in the fan. In certain embodiments, more than one guide hole can be provided to create multiple attachment holes in the basal portion of the turkey tail fan.

As shown in FIG. 8, the basal region 88*j* includes potential fastener positions 82*a* and 82*b* located in the right 88*c* and left 88*b* basal sub-regions, respectively. In certain other embodiments, the potential fastener positions 82*a* and 82*b* can be located anywhere in the basal region 88*j*. In one or more embodiments, the potential fastener positions 82*a* and 82*b* can include a can include a hole through which any of the above-discussed fasteners can extend. In certain embodiments, the potential fastener positions 82*a* and 82*b* can include any type of fastener removably coupled to or permanently fixed to the bottom sheet 88. In another embodiment, the potential fastener positions 82*a* and 82*b* can be proximal to the peripheral edge of the bottom sheet and can include any fastener that can secure the bottom sheet 88 and a top sheet together. In certain embodiments, the basal region 88*j* can have at least 1, 2, or 3 and/or not more than 8, 4, or 2 fasteners located therein. In yet another embodiment, the potential fastener positions 82*a* and 82*b* can include fan-positioning protrusions that are not fasteners.

The distal region 88*i* can have at least 2, 3, or 4 and/or not more than 12, 8, or 6 potential fastener positions 84 located therein. In the embodiment depicted in FIG. 8, the left and right distal sub-regions 88*e* and 88*f* each have three potential fastener positions 84 located therein; and the center distal sub-region 88*g* has four potential fastener positions 84 located therein. As shown in the bottom sheet 88 of FIG. 8, the location of these potential fastener positions 84 in the distal region 88*i* can accommodate fasteners extending through the turkey tail fan 86 at a location separate from the basal portion of the turkey tail fan 86, when in a fan-holding configuration.

FIG. 9 depicts another embodiment of a bottom sheet 98 in a fan-positioning configuration. The bottom sheet 98 has the shape of a six-sided polygon. The surface area and $R_3$ values discussed with reference to the bottom sheet 88 of FIG. 8 apply in this embodiment of FIG. 9.

FIG. 9 shows the location of a basal region 98*j* and a distal region 98*i*. The basal region 98*j* and distal region 98*i* and their respective sub-regions are defined in the same manner as was discussed in detail with reference to the bottom sheet 88 of FIG. 8. For example, the basal region 98*j* and the left, right, and center basal sub-regions 98*b*, 98*c*, 98*d* are bounded by the radially extending margins 93*a* and 93*b*, the semicircular basal margin 95*a*, and the bottom edge 98*a*, in a similar manner as discussed with reference to the basal region 88*j* of FIG. 8. Further, the distal region 98*i* and the left, right, and center distal sub-regions 98*e*, 98*f*, 98*g* are defined by the radially extending margins 93*a* and 93*b*, the semicircular distal margin 95*b*, and the edges of the bottom sheet 98, in a similar matter as discussed with reference to the distal region 88*i* of FIG. 8. Further, the bottom edge center point 98*h* is defined by the intersection of the center axis 91 with the bottom edge 98*a*.

In the embodiment depicted in FIG. 9, the bottom sheet 98 includes a single potential fastening position 92 in the basal region 98*j*. As shown in FIG. 9, the potential fastening position 92 is substantially located on the center vertical axis 91 of the center basal sub-region 98*d*. In other embodiments, the potential fastening position 92 can be located in the left 98*b* and/or right 98*c* basal sub-regions. In another embodiment, the potential fastening position 92 can operate to fasten the tail fan 96 in a fan-holding position by including a fastener, which extends through the basal portion of the tail fan 96 thereby creating a hole, which can subsequently be used as an attachment hole for attaching a concealment structure to the turkey tail fan 96. The potential fastening position 92 can have the same characteristics as the potential fastening positions discussed above with reference to FIG. 8.

As shown in FIG. 9, the distal region 98*i* of the bottom sheet 98 includes one potential fastener position 94 in each of the three distal sub-regions 98*e*, 98*f*, and 98*g*. These potential fastener positions 94 can have the same characteristics as the potential fastener positions of FIG. 8, as discussed above. In certain embodiments, these three potential fastener positions 94 can secure the bottom sheet 98, a turkey tail fan 96, and a top sheet together in a fan-holding configuration.

FIG. 10 depicts another embodiment of a bottom sheet 108 in a fan-positioning configuration. The bottom sheet 108 has a substantially semicircular shape. The surface area and $R_3$ values discussed above, with reference to FIG. 8, can apply in this embodiment of FIG. 10.

FIG. 10 shows the location of a basal region 108*j* and a distal region 108*i*. The basal region 108*j* and distal region 108*i* and their respective sub-regions are defined in the same manner as was discussed in detail with reference to the bottom sheet 88 of FIG. 8. For example, the basal region 108*j* and the left, right, and center basal sub-regions 108*b*, 108*c*, 108*d* are defined by the radially extending margins 103*a* and 103*b*, the semicircular basal margin 105*a*, and the bottom edge 108*a*, in a similar manner as discussed with reference to the basal region 88*j* of FIG. 8. Further, the distal region and left, right, and center distal sub-regions 108*e*, 108*f*, 108*g* are defined by the radially extending margins 103*a* and 103*b*, the semicircular distal margin 105*b*, and the edges of the bottom sheet 108, in a similar manner as discussed with reference to the distal region 88*i* of FIG. 8. Further, the bottom edge center point 108*h* is defined by the intersection of the center axis 101 with the bottom edge 108*a*. In the embodiment depicted in FIG. 10, the bottom sheet 108 has potential fastener positions 102*b* and 102*a* in the left and right distal sub-regions 108*b* and 108*c*, respectively. The potential fastener positions 102*a* and 102*b* can have the same characteristics as the potential fastener positions discussed with reference to the embodiment of FIG. 8. In another embodiment, the potential fastener positions 102*a* and 102*b* can be placed in any location within the basal region 108*j*.

Further, as shown in FIG. 10, the bottom sheet 108 has two potential fastener positions 104 in each of the left and the right distal sub-regions 108*e* and 108*f*, while the center distal sub-region 108*g* includes four potential fastener positions 104. The potential fastener positions 104 can have the same characteristics as the potential fastener positions discussed with reference to the embodiment of FIG. 8.

The bottom sheet 108 of FIG. 10 includes a guide hole 107 in the center basal sub-region 108*d*. In one embodiment, the guide hole 107 can be used to create an attachment hole in the basal region of a turkey tail fan 106, when the turkey tail fan 106, the bottom sheet 108, and a top sheet are in a fan-holding configuration. The guide hole 107 can have the same characteristics as those mentioned regarding the guide hole 14 of FIG. 3.

FIG. 11 depicts another embodiment of a bottom sheet 118 in a fan-positioning configuration. As shown in the embodiment of FIG. 11, the bottom sheet 118 has a triangular shape. The surface area and $R_3$ values discussed above with reference to the bottom sheet 88 of FIG. 8 can apply in this embodiment of FIG. 11.

FIG. 11 shows a basal region 118*j* and a distal region 118*i*. The basal region 118*j* and distal region 118*i* and their respective sub-regions are defined in the same manner as was discussed in detail with reference to the bottom sheet 88 of FIG. 8. For example, the basal region 118*j* and the left, right, and center basal sub-regions 118*b*, 118*c*, 118*d* are defined by the radially extending margins 113*a* and 113*b*, the semicircular basal margin 115*a*, and the bottom edge 118*a*, in a similar manner as discussed with reference to the basal region 88*j* of FIG. 8. Further, the distal region 118*i* and the left, right, and center distal sub-regions 118*e*, 118*f*, 118*g* are defined by the radially extending margins 113*a* and 113*b*, the semicircular distal margin 115*b*, and the edges of the bottom sheet 118, in a similar manner as discussed with reference to the distal region 88*i* of FIG. 8. Further, the bottom edge center point 118*h* is defined by the intersection of the center axis 111 on the bottom edge 118*a*.

As shown in FIG. 11, the bottom sheet 118 includes potential fastener positions 112*b* and 112*a* in the left and right basal sub-regions 118*b* and 118*c*, respectively. The potential fastener positions 112*a* and 112*b* can have the same characteristics as those discussed above with reference to FIG. 8. Additionally, in the embodiment depicted in FIG. 11, the basal region 118*j* does not include a guide hole. In certain other embodiments, the basal region 118*j* may include a guide hole.

As shown in FIG. 11, the bottom sheet 118 includes four potential fastener positions 114 in the distal region 118*i*. In the embodiment of FIG. 11, one potential fastener position is located in each of the left and right distal sub-regions 118*e* and 118*f*, and two potential fastener positions 114 are located in the center sub-region 118*g*. The potential fastener positions 114 in the distal region 118*i* can have the same characteristics as the potential fastener positions discussed above with reference to FIG. 8.

Figure 12:
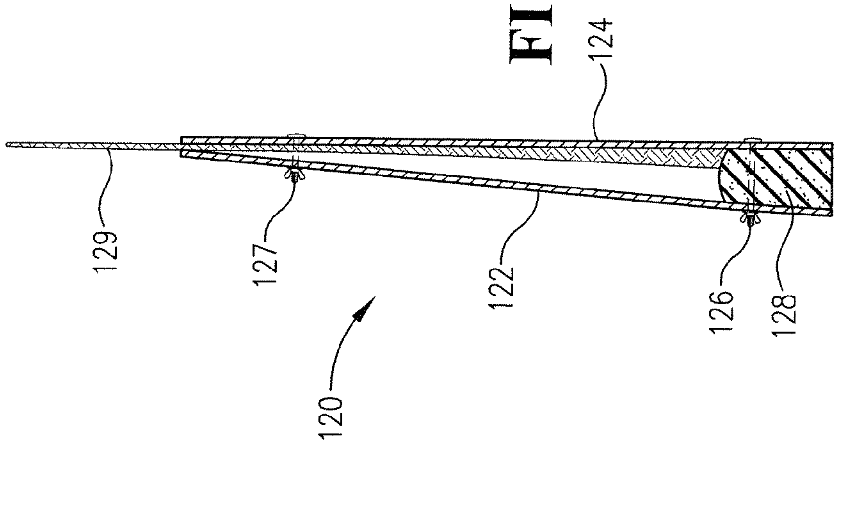
FIG. 12 is a side cross-sectional view of an apparatus in a fan-holding configuration in accordance with one embodiment of the present invention, particularly showing a turkey tail fan in between top and bottom sheets secured to one another with a plurality of fasteners.

FIG. 12 depicts a cross sectional view of one embodiment of a fan fixing apparatus 120 in a fan-holding configuration. The apparatus 120 of FIG. 12 includes a turkey tail fan 129 in between the top 122 and bottom 124 sheets. As shown in FIG. 12, the apparatus 120 includes a fastener 126, which extends through the basal region 128 of the turkey tail fan and through the top 122 and bottom 124 sheets. The apparatus 120 further includes a fastener 127 extending through the outer region of the turkey tail fan 129 and though the top 122 and bottom 124 sheets, as depicted in FIG. 12. The fasteners 126 and 127 secure the turkey tail fan 129 and the top 122 and bottom 124 sheets to one another to thereby flatten the turkey tail fan 129 in a natural spread configuration. The apparatus 120 of FIG. 12 is just one embodiment of a fan fixing apparatus in a fan-holding configuration and any number of variations can be made to the top sheet 122, bottom sheet 124, and fasteners 126 and 127, as described above.

Figure 13:
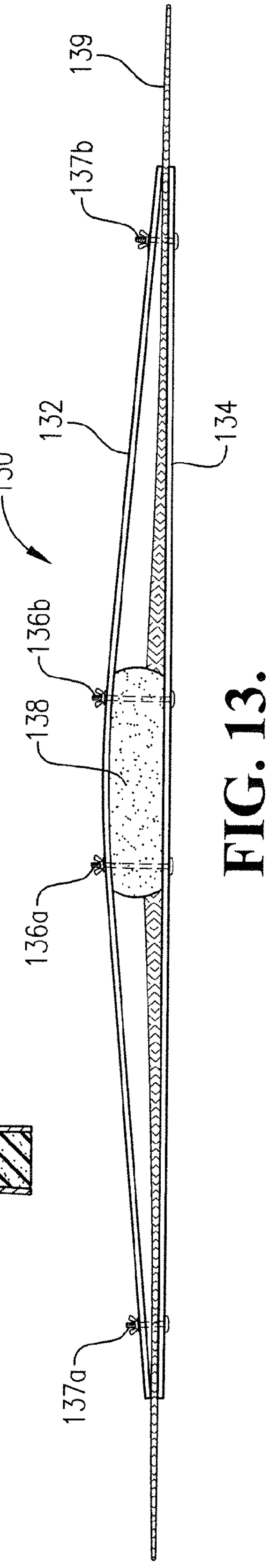
FIG. 13 is a bottom view of an apparatus in a fan-holding configuration in accordance with one embodiment of the present invention, particularly showing a turkey tail fan in between top and bottom sheets secured to one another with a plurality of fasteners.

FIG. 13 depicts a bottom view of a fan fixing apparatus 130 in a fan holding configuration. As shown in FIG. 13, the turkey tail fan 139 is positioned between a bottom sheet 134 and a top sheet 132. Fasteners 136*a* and 136*b* extend through the basal portion 138 of the turkey tail fan and through the top 132 and bottom 134 sheets, as depicted in FIG. 13. Further, in the embodiment of FIG. 13, the fasteners 137*a* and 137*b* extend through the outer region of the turkey tail fan 139 and through the top 132 and bottom 134 sheets. As shown in FIG. 13, the fasteners 136*a*, 136*b*, 137*a*, and 137*b* secure the turkey tail fan 139 to the top 132 and bottom 134 sheets so as to flatten the turkey tail fan and fix it in a natural spread configuration. The apparatus 130 of FIG. 13 is but one embodiment of a fan fixing apparatus and any number of variations can be made to the top sheet 132, bottom sheet 134, and fasteners 136*a*, 136*b*, 137*a*, and 137*b*, as described above.

It is the inventor's intent to rely on the Doctrine of Equivalents to determine and assess the reasonably fair scope of the present invention as it pertains to any apparatuses, methods, or kits not materially departing from but outside the literal scope of the invention as set forth in the following claims.

What is claimed is:

1. An apparatus for fixing a turkey tail fan in a natural spread configuration, wherein said turkey tail fan includes a basal portion comprising connective and/or muscle tissue holding together individual feathers of said fan, said apparatus comprising:

a bottom sheet presenting a substantially flat first surface;

a top sheet presenting a substantially flat second surface;

an angled member extending from said bottom sheet and presenting a support surface that is substantially perpendicular to said first surface; and a plurality of fasteners for releasably coupling said top and bottom sheets to one another, wherein said apparatus is shiftable between a fan-positioning configuration and a fan-holding configuration, wherein, when said apparatus is in said fan-positioning configuration, said top sheet is spaced from said bottom sheet by a distance sufficient to allow said turkey tail fan to be positioned on said first surface and against said support surface, wherein, when said apparatus is in said fan-holding configuration, said top and bottom sheets are secured to one another by said fasteners so as to fix said turkey tail fan between said first and second surfaces while said basal portion of said fan is held against said support surface.

2. The apparatus according to claim 1, wherein at least two of said fasteners are configured to extend through said turkey tail fan at locations spaced from said basal portion when said apparatus is in said fan-holding configuration.

3. The apparatus according to claim 1, wherein said apparatus further comprises a pair of fan-positioning protrusions coupled to said bottom sheet and extending from said first surface, wherein said fan-positioning protrusions are configured to support the outermost feathers of said turkey tail fan when said turkey tail fan is spread out on said bottom sheet with said basal portion of said turkey tail fan contacting said support surface.

4. The apparatus according to claim 3, wherein said fan-positioning protrusions comprise a pair of said fasteners.

5. The apparatus according to claim 1, wherein said angled member is integral with said bottom sheet.

6. The apparatus according to claim 1, wherein each of said first and second surfaces has a surface area of at least 25 square inches and not more than 1,600 square inches.

7. The apparatus according to claim 1, wherein said apparatus employs at least three of said fasteners and/or not more than 16 of said fasteners to hold said apparatus in said fan-holding configuration.

8. The apparatus according to claim 1, wherein, when said apparatus is in said fan-holding configuration, said apparatus presents a basal region for receiving said basal portion of said fan and a distal region spaced outwardly from said basal region, wherein at least one of said fasteners is located within said basal region, wherein at least two of said fasteners are located within said distal region.

9. The apparatus according to claim 8, wherein said apparatus comprises at least two fan-positioning protrusions extending substantially perpendicular from said first surface, wherein said fan-positioning protrusions are located in said basal region.

10. The apparatus according to claim 9, wherein said basal region is divided into left, right, and center basal sub-regions, wherein at least one of said fan-positioning protrusions is located in each of said left and right basal sub-regions.

11. The apparatus according to claim 10, wherein each of said top and bottom sheets defines a guide hole, wherein, when said apparatus is in said fan-holding configuration, said guide holes are aligned with one another in said central basal sub-region.

12. The apparatus according to claim 8, wherein said distal region is divided into left, right, and center distal sub-regions, wherein at least one of said fasteners is located in each of said distal sub-regions, wherein not more than 12 of said fasteners are located in said distal region.

13. A method of fixing a turkey tail fan, said method comprising:

(a) positioning a turkey tail fan on a bottom member in a natural spread configuration;

(b) placing a top member over said turkey tail fan while said turkey tail fan is in said natural spread configuration on said bottom member; and (c) fastening said top and bottom members to one another in a fan-holding configuration via a plurality of fasteners extending through said turkey tail fan, thereby fixing said turkey tail fan between said top and bottom members in said natural spread configuration.

14. The method according to claim 13, wherein step (a) includes (i) placing a basal portion of said turkey tail fan against a support surface extending upward from said bottom member, (ii) extending a first fan-positioning protrusion through said turkey tail fan adjacent one of the outmost feathers of said turkey tail fan, and (iii) extending a second fan-positioning protrusion through said turkey tail fan adjacent the other of the outmost feathers of said turkey tail fan, wherein said support surface and said first and second protrusions cooperatively support said turkey tail fan in said natural spread configuration.

15. The method according to claim 13, wherein step (a) includes contacting a back side of said turkey tail fan with a substantially flat first surface of said bottom member, wherein step (b) includes contacting a front side of said turkey tail fan with a substantially flat second surface of said top member, wherein step (c) includes securing said first and second surfaces in contact with said turkey tail fan so as to orient and maintain all the feathers of said turkey tail fan in a single plane.

16. The method according to claim 13, wherein step (c) includes extending at least one of said fasteners through a circular basal region cooperatively formed by said top and bottom members, wherein step (c) includes extending at least two of said fasteners through a distal region cooperatively formed by said top and bottom members.

17. The method according to claim 13, wherein step (c) includes reducing the distance between said top and bottom members, thereby clamping said turkey tail fan between said top and bottom members.

18. The method according to claim 13, wherein, when said top and bottom members are in said fan-holding configuration, said top member covers at least 25 percent of the total area of the front of said turkey tail fan.

19. The method according to claim 13, further comprising holding said turkey tail fan in said natural spread configuration until a basal portion of said turkey tail fan has dried sufficiently to sustain said turkey tail fan in said natural spread configuration without external support, further comprising, after a basal portion of said turkey tail fan has dried sufficiently to sustain said turkey tail fan in said natural spread configuration without external support, detaching said top and bottom members from one another and removing said turkey tail fan from said top and bottom members.

20. The method according to claim 19, further comprising, prior to said detaching of said top and bottom portions, drilling an attachment hole in a basal portion of said turkey tail fan using aligned holes in said top and bottom members as a guide for said drilling, further comprising, after said detaching of said top and bottom portions, attaching a concealment structure to said basal portion of said turkey tail fan by extending a fastener at least partly into said attachment hole, wherein said concealment structure is sized to cover substantially all of said basal portion of said fan while permitting a substantial portion of the plumage of said feathers to be viewed for display.

21. The method according to claim 19, further comprising, after said detaching of said top and bottom portions, re-using said top and bottom members to fix a different turkey tail fan in a natural spread configuration.

22. A kit for fixing and displaying a turkey tail fan in a natural spread configuration, wherein said turkey tail fan comprises a basal portion comprising connective and/or muscle tissue holding together individual feathers of said fan, said kit comprising:

a fan-fixing apparatus for fixing said turkey tail fan in said natural spread configuration, wherein said fan-fixing apparatus is shiftable between a fan-positioning configuration and a fan-holding configuration, wherein said fan-fixing apparatus is configured to receive said turkey tail fan when in said fan-positioning configuration, wherein said fan-fixing apparatus is configured to hold said turkey tail fan in said natural spread configuration when in said fan-holding configuration, wherein said fan-fixing apparatus comprises at least one guide hole for guiding the drilling of an attachment hole through said basal portion of said turkey tail fan while said fan is held in said fan-fixing apparatus; and a fan-displaying apparatus for displaying said turkey tail fan in said natural spread configuration, wherein said fan-displaying apparatus comprises a concealment structure and at least one fastener, wherein said fastener is configured to extend at least partly into said attachment hole and fasten said concealment structure to said basal portion of said turkey tail fan, wherein said concealment structure is configured to cover said basal portion of said turkey tail fan.

23. The kit according to claim 22, wherein said fan-fixing apparatus comprises a bottom sheet presenting a substantially flat first surface, a top sheet presenting a substantially flat second surface, an angled member extending from said bottom sheet and presenting a support surface that is substantially perpendicular to said first surface, and a plurality of fasteners for releasably coupling said top and bottom sheets to one another, wherein, when said fan-fixing apparatus is in said fan-positioning configuration, said top sheet is spaced from said bottom sheet by a distance sufficient to allow said turkey tail fan to be positioned on said first surface and against said support surface, wherein, when said fan-fixing apparatus is in said fan-holding configuration, said top and bottom sheets are secured to one another by said fasteners so as to fix said turkey tail fan between said first and second surfaces while said basal portion of said fan is held against said support surface.

24. The kit according to claim 22, wherein said concealment structure is sized to cover substantially all of said basal portion while permitting substantially all of the plumage of said feathers to be viewed for display.

25. The kit according to claim 22, wherein said concealment structure is a plaque or a picture frame.

* * * * *